Dec. 18, 1962 R. H. ARNETT 3,068,915
PLYWOOD PANEL EDGING MACHINE
Filed Sept. 21, 1959 4 Sheets-Sheet 1

INVENTOR.
RAY H. ARNETT
BY
Kimmel & Crowell
ATTORNEYS

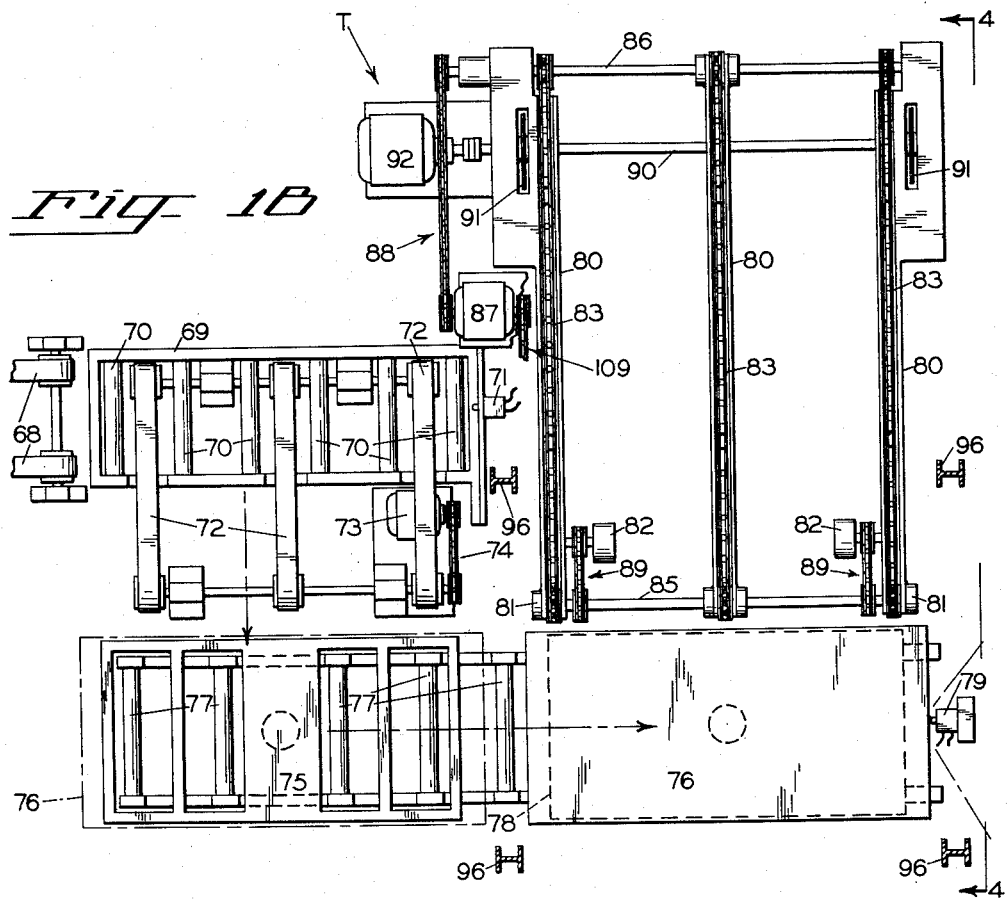

Dec. 18, 1962 R. H. ARNETT 3,068,915
PLYWOOD PANEL EDGING MACHINE
Filed Sept. 21, 1959 4 Sheets-Sheet 3

INVENTOR.
RAY H. ARNETT
BY
Kimmel & Crowell
ATTORNEYS

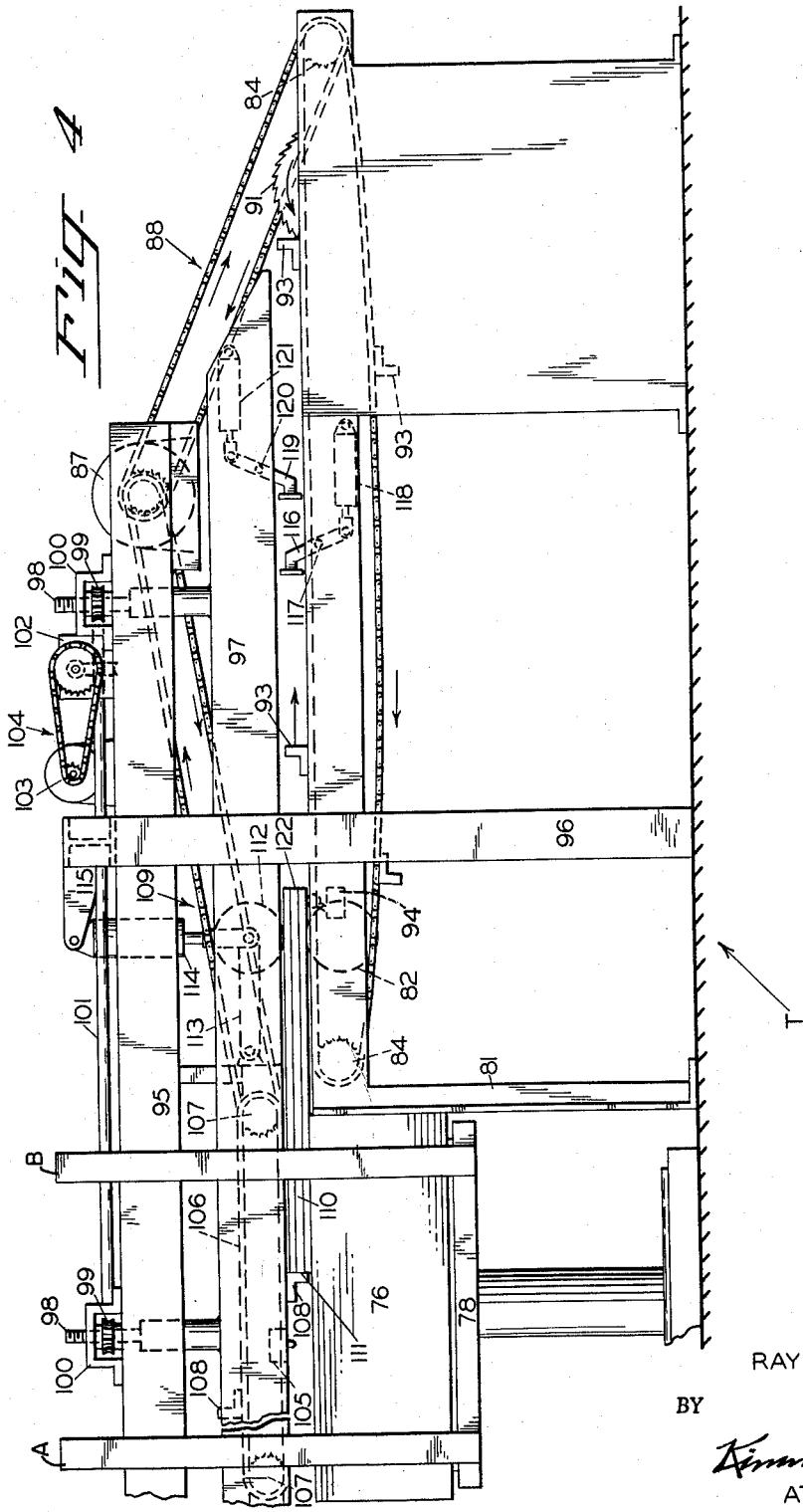

United States Patent Office 3,068,915
Patented Dec. 18, 1962

3,068,915
PLYWOOD PANEL EDGING MACHINE
Ray H. Arnett, Brookings, Oreg.
(440 N. Grape, Apt. 1, Medford, Oreg.)
Filed Sept. 21, 1959, Ser. No. 841,067
9 Claims. (Cl. 144—2)

The present invention relates to a plywood panel edging machine for accurately forming straight edges on plywood panels.

The primary object of the invention is to automatically trim plywood sheets to produce a panel of accurate predetermined dimension.

Another object of the invention is to provide an automatic plywood edging machine capable of trimming a single plywood panel or a plurality of stacked plywood panels to produce plywood panels of a uniform predetermined dimension.

A further object of the invention is to provide an automatic plywood edging machine which requires but one operator to control the complete sequence of steps in the trimming of plywood panels.

A still further object of the invention is to provide a plywood edging machine of the class described above having means for flattening a warped panel and maintaining the warped panel in flat condition during the edging operation.

Other objects and advantages will become apparent in the following specification when considered in light of the attached drawings, in which:

FIGURE 1A and FIGURE 1B constitute a top plan view of the invention with parts omitted for clarity;

FIGURE 2 is a fragmentary end elevation of the structure illustrated in FIGURE 1A taken substantially along the line 2—2 of FIGURE 1A, looking in the direction of the arrows;

FIGURE 3 is an enlarged fragmentary transverse cross section taken along the line 3—3 of FIGURE 2, looking in the direction of the arrows; and FIGURE 4 is a fragmentary end elevation of the invention taken substantially along the line 4—4 of FIGURE 1B, looking in the direction of the arrows.

Referring now to the drawings in detail wherein like reference characters indicate like parts throughout the several figures, the reference character T indicates generally a plywood panel edge trimming machine constructed in accordance with the invention.

Figure 1A:
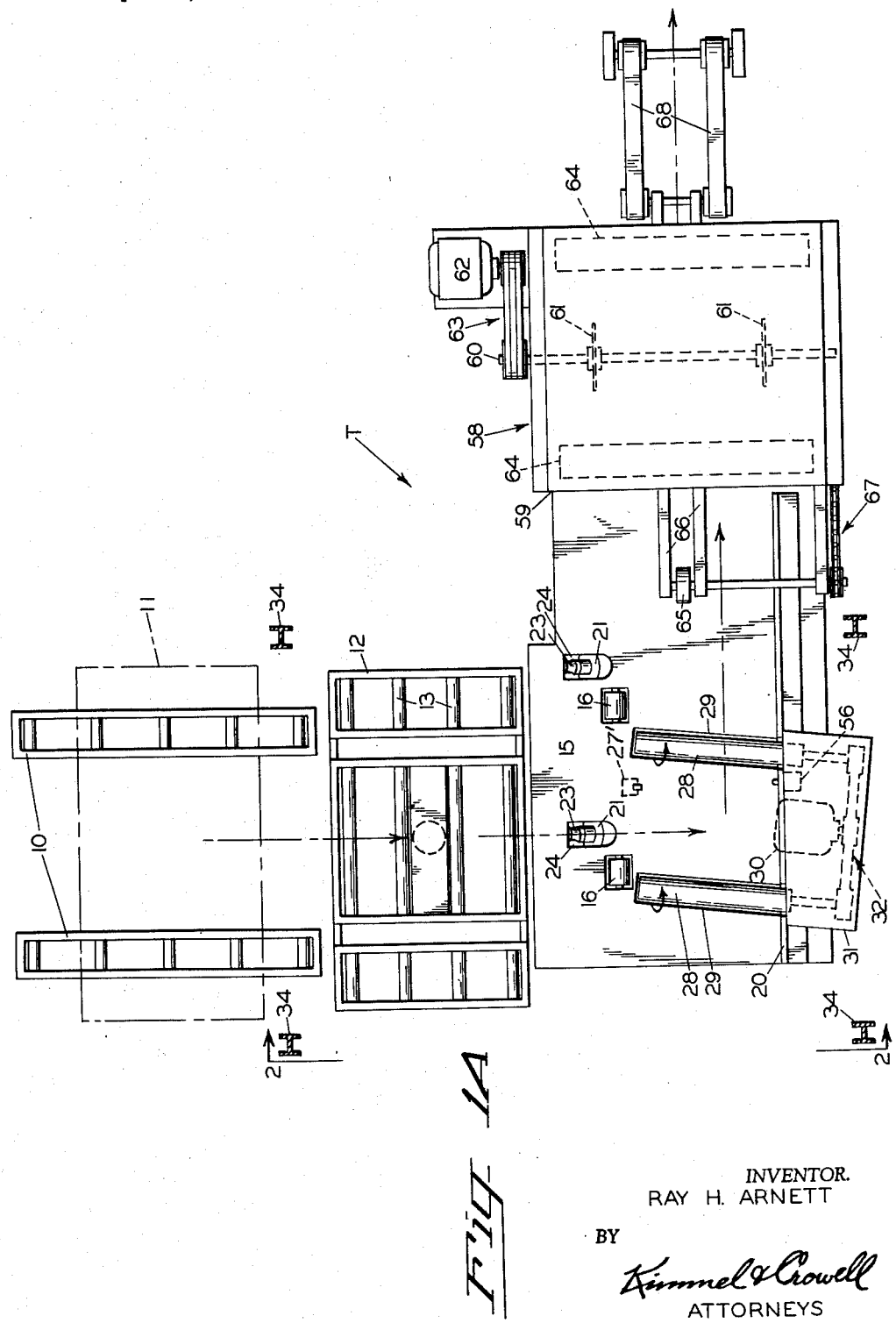

The machine T includes a pair of generally horizontal feed roller supports 10 which are adapted to receive a stack 11 of untrimmed plywood panels positioned thereon by a lift truck (not shown) or any other suitable means. The stack 11 is moved across the feed roller supports 10 on to an elevator 12 having a plurality of support rollers 13 on the upper surface thereof. The elevator 12 is vertically adjustable, for reasons to be assigned.

A frame 14 is positioned adjacent the elevator 12 and has a horizontal table 15 supported thereon. A pair of drive rollers 16 are recessed in the top of the table 15 with their axes aligned and parallel to the axes of the rollers 13. A motor 17 is mounted on a bracket 18 suspended beneath the table 15 on the frame 14 and drives the rollers 16 through a sprocket chain 19. An elongated upstanding stop 20 is mounted along the edge of the table 15 remote from the elevator 12 and is arranged parallel to the axis of the rollers 16.

A pair of motors 21 are pivotally mounted in brackets 22 depending from the frame 14 beneath the table 15 and have rollers 23 mounted for rotation thereon. The table 15 has apertures 24 formed therein overlying each of the rollers 23 so that the rollers 23 may project upwardly through the table 15 when motors 21 are swung on brackets 22 to a position with their axis perpendicular. A link 25 depends from each motor 21 and the ends of a pair of hydraulic rams 26 are pivotally connected thereto. Arms 27 depend from the bracket 18 with the opposite ends of the hydraulic rams 26 pivotally connected thereto so that actuation of the rams 26 will swing the motors 21 on the brackets 22, moving the rollers 23 from a position below the table top 15 to a position extending thereabove.

A pair of spaced parallel drive rollers 28 are arranged with their axes parallel to the top of the table 15 and are positioned so as to extend upwardly through a pair of spaced parallel, generally rectangular openings 29 formed in the table 15. The rollers 28 are arranged at an angle to the stop 20 less than 90° so that rotation of the rollers 28 in the direction of the arrows, as seen in FIGURE 1A, will move material across the table 15 to the right, as viewed in FIGURE 1A, as well as tending to move the material toward the stop 20. A motor 30 is mounted in a housing 31 and is connected for driving relation to the rollers 28 by a chain and sprocket drive system, generally indicated at 32.

A frame 33 is arranged in overlying relation to the table 15 and the elevator 12 supported on a plurality of legs 34. An adjustable frame 35 is arranged in underlying parallel relation to the frame 33 and has a plurality of upstanding threaded guide posts 36 rigidly secured thereto and extending therefrom to a point above the frame 33. A worm nut 37 is threaded on each of the posts 36 and is supported in a bracket 38 on the frame 33. A shaft 39 extends between the worm nuts 37 in driving relation thereto and terminates in a gear box 40 connected to a motor 41 through a chain and sprocket drive, generally indicated at 42. Rotation of the motor 41 rotates the shaft 39 and vertically adjusts the threaded posts 36 to vertically adjust the frame 35 with respect to the frame 33.

A limit switch 43 is mounted on the frame 35 overlying the elevator 12 controlling the upward movement of the elevator when the stack 11 comes in contact therewith.

A conveyor chain 44 extends horizontally on the frame 35 carried by a pair of sprockets 45, 46 at opposite ends thereof. The conveyor chain 44 has a pair of dogs 47 mounted thereon for engaging the trailing edge 48 of a batch 49 of plywood panels to be moved through the machine T. The dogs 47 move transversely across the stack 11 so as to move the batch 49 from the elevator 12 on to the table 15. A motor 50, mounted on the frame 33, is connected to the conveyor chain 44 through a chain and sprocket drive, generally indicated at 51.

A pressure roller 52 is arranged in overlying relation to each of the drive rollers 16 and is mounted on a swinging arm 53 pivoted to the frame 35. A bracket 54 is also mounted on the frame 35 overlying the pressure roller 52. The hydraulic ram 55 is connected at one end to the pressure roller 52 and at the opposite end to the bracket 54 so that upon actuation thereof, the pressure roller 52 will be forced downwardly toward the drive rollers 16 to maintain the batch 49 in driving contact with the drive rollers 16.

A limit switch 56 is mounted on the stop 20 and is engaged by the leading edge 57 of the batch 49 to stop the motor 17 and simultaneously to raise the pressure roller 52 out of contact with the upper surface of the batch 49. A switch 27' is mounted in the table 15 intermediate the drive rollers 16 and is engaged by the leading edge 57 of the batch 49 to actuate the hydraulic ram 55 to bring the pressure roller 52 into engagement with the upper surface of the batch 49. The drive rollers 16 have a driving speed with respect to the batch 49 slightly faster than the dog 47 so that the batch 49 is moved out of engagement with the dog 47 when the drive roller 16 and pressure roller 52 commence their driving operation with respect thereto.

The elevator 12 is controlled by the limit switch 43 so that as soon as one batch 49 is removed from the upper surface thereof, the stack 11 will be elevated until its new upper surface comes in contact with the limit switch 43 so that another batch 49 may be removed therefrom by the dogs 47. Coaction of the elevator 12 and the dogs 47 will continue until all of the stack 11 has been removed from the elevator 12, whereupon a new stack 11 is moved thereon from the feed roller supports 10.

An edging saw, supported in a generally rectangular frame, generally indicated at 58, extends transversely of the table 15 at the end 59 thereof toward which the rollers 28 move the batch 49. The rollers 23 driven by the motor 21 are swung upward into engagement with the trailing edge 48 of the batch 49 by the hydraulic ram 26 controlled by the limit switch 56. The rollers 23 assist in moving the batch 49 toward the saw 58, as well as maintaining the batch 49 in engagement with the guide 20.

The saw 58 has a transverse shaft 60 carrying spaced apart parallel saw blades 61 thereon for simultaneously trimming the opposite edges of the batch 49. A motor 62 drives the shaft 60 through a belt and sprocket drive, generally indicated at 63. Powered rollers 64 form a part of the edging saw 58 to move the batch 49 therethrough. A hold-down roller 65 is arranged in overlying relation to the table 15 and mounted on a pair of arms 66 extending horizontally outwardly from the saw 58. The roller 65 is driven from the saw 58 by a chain and sprocket drive, generally indicated at 67. The roller 65 assists in moving the batch 49 into contact with the power rollers 64 in the saw 58.

It should be understood that the stop 20 can be adjusted transversely of the table 15 so as to provide for different widths of plywood panels to be trimmed.

The batch 49, after trimming in the edger saw 58, is moved outwardly therefrom on conveyor belts 68 extending horizontally from the delivery end of the edger saw 58. A frame 69 is arranged at the end of the belt conveyor 68 and has a plurality of powered rollers 70 mounted therein to support the batch 49 and move it in the same general horizontal direction until it contacts the limit switch 71, as seen in FIGURE 1B.

A plurality of transversely extending feed belts 72 are driven by an electric motor 73 through a chain and sprocket drive, generally indicated at 74. The belts 72 extend transversely of the frame 69 and laterally outwardly therebeyond on one side. The limit switch 71 drops the frame 69 and the power rollers 70 below the level of the belts 72 so that the batch 49 is supported thereon and moved laterally on to an elevator 75. The elevator 75 lowers automatically as the batches 49 are deposited thereon, until a stack 76 of batches 49 is supported thereon. A plurality of drive feed rollers 77 are subsequently actuated to move the stack 76 from the elevator 75 on to a second elevator 78. A limit switch 79 is engaged by the stack 76 to cause the rotation of feed rollers 77 to cease. The stack 76 is aligned by the edges thereof coming in contact with upright members A and B.

A pair of drive rollers 82 are secured in horizontally aligned relation to the support 80 and project slightly thereabove. A plurality of conveyor chains 83 extend longitudinally of the support 80 and are trained over drive sprockets 84 arranged at opposite ends thereof. The drive sprockets 84 are mounted on an idler shaft 85 at one end of the support 80 and on a drive shaft 86 at the opposite end of the support 80. An electric motor 87 is connected to the drive shaft 86 through a chain and sprocket drive, generally indicated at 88. The drive rollers 82 are driven from the idler shaft 85 by a chain and sprocket drive, generally indicated at 89.

A saw shaft 90 extends transversely of the supports 80 adjacent the drive shaft 86 and parallel thereto. A saw blade 91 is mounted on each end of the saw shaft 90 so as to project above the supports 80. An electric motor 92 is connected to the saw shaft 90 for rotating the saw shaft 90. The conveyor chains 83 have a plurality of dogs 93 mounted thereon in equispaced relation. A switch 94 is mounted on the support 80, for reasons to be assigned.

A horizontal frame 95 is arranged in overlying relation to the elevator 78 and the support 80 and is mounted on a plurality of legs 96. A vertically adjustable frame 97 is arranged in horizontal underlying relation to the frame 95 and has a plurality of upstanding threaded posts 98 extending above the frame 95. A plurality of worm nuts 99 are threaded on to the threaded posts 98 and are supported in brackets 100 on the frame 95. A shaft 101 extends between the worm nuts 99 and is in driving engagement therewith. The shaft 101 extends through a gear box 102 which is driven by an electric motor 103 connected thereto through a chain and sprocket drive, generally indicated at 104. Operation of the electric motor 103 rotates the worm nuts 99 and vertically adjusts the frame 97 with respect to the frame 95. The adjustable frame 97 has a limit switch 105 mounted thereon overlying the elevator 78, upon contact of the stack 76 therewith. A conveyor chain 106 is mounted on the frame 97 on a pair of sprockets 107 and has a pair of dogs 108 secured thereto. A chain and sprocket drive, generally indicated at 109, connects the conveyor chain 106 to the motor 87 for operation thereby. A batch 110 of plywood panels has the trailing edge 111 thereof engaged by one of the dogs 108 to move the batch 110 on to the supports 80 and on to the drive roller 82 positioned thereon.

A pressure roller 112 is carried by a swinging arm 113 pivotally mounted on the frame 97. A hydraulic ram 114 has one end connected to the pressure roll 112 and the opposite end mounted on a bracket 115, forming a part of the frame 95. The pressure roll 112 is arranged in overlying relation to the drive roller 82 and the hydraulic ram 114 is actuated by the switch 94 to bring the pressure roller 112 into contact with the upper surface of the batch 110 of plywood panels, holding them in driving engagement with the drive rollers 82 so that they can be moved across the support 80 toward the saw blades 91.

A bumper 116 is secured to the support 80 by a pivot pin 117 intermediate the upper and lower ends thereof. A hydraulic dash pot 118 has one end connected to the support 80 and the opposite end connected to the lower end of the bumper 116. A second bumper 119 is connected to the movable frame 97 by means of a pivot pin 120 intermediate the upper and lower ends thereof. A hydraulic dash pot 121 is pivotally connected at one end to the frame 97 and at the opposite end to the upper end of the bumper 119. The bumpers 116, 119 successively engage the leading edges 122 of the batch 110 to retard the movement of the batch 110 to make sure that the trailing edge 111 thereof is in contact with a dog 93 on the chain 83.

The dogs 93 and 108 operate in synchronism so that the movement of the batch 110 toward the saw blades 91 is relatively uniform so as to produce a generally uniform production from the machine T.

The structure of the present invention is such as to maintain a plurality of plywood panels in aligned relation, while feeding the panels through pairs of parallel trimming saw blades to trim the parallel sides and the parallel ends to produce plywood panels of a uniform side-to-side and end-to-end dimension. The frames 35 and 97 can be vertically adjusted together with the dogs 108 to vary the number of plywood panels in the batches 49 and 110, within the limits of the height of the dogs whereby a minimum of one panel may be moved, or as illustrated in FIGURES 2 and 4, a maximum of three. The maximum number of panels moved can be varied by substituting a dog of greater height.

Having thus described the preferred embodiment of the invention, it should be understood that numerous structural modifications and adaptations may be resorted to without departing from the scope of the appended claims.

What is claimed:

1. An apparatus for trimming the edges of a plurality of stacked superposed panels comprising in combination a first work supporting table, work moving and aligning means at one end of said table, a pair of saw blades in spaced parallel relation to trim opposite edges of said panels at the other end of said table and having work feeding means associated therewith, means for maintaining a supply of panels adjacent said table at the end thereof having said work moving and aligning means, work transfer means overlying said supply of panels and said table and feed rolls on said work transfer means and said table operatively engaging a stack of panels to move the same onto said table and into engagement with the work moving means thereon, and a second work supporting table at right angles to said first table having means to trim the edges of said panels adjacent those trimmed by said saw blades.

2. An apparatus as defined in claim 1 wherein said second work supporting table includes at one end a pair of saw blades disposed on opposite sides thereof in parallel relation, work feeding means on said table, means to maintain a supply of panels adjacent the table at the end opposite said saw blades, work transfer means overlying said supply and said table, feed rolls on said work transfer means and said table engaging a stack of panels to move the same into engagement with the work feeding means on said table and work transfer means between said first work supporting table and the supply maintaining means adjacent said second table.

3. An apparatus as defined in claim 1 wherein said work feeding means overlying said supply of panels includes means to operatively engage the edges of a plurality of superposed panels to move the same, said work transfer means being vertically adjustable to vary the number of panels transferred to said first work supporting table, said supply maintaining means being vertically adjustable and means on said work transfer means to limit vertical movement of said supply maintaining means.

4. An apparatus as defined in claim 1 which further includes means supporting said saw blades in overlying relation to said first work supporting table, said saw blade supporting means comprising a substantially rectangular frame, a saw blade axle rotatable mounted in said frame, work feeding rolls mounted in said frame on opposite sides of said axle, and a pressure and feed roll disposed in overlying relation to said table between said saw blades and said work moving and aligning means and means driving said saw blade axle, work feeding rolls and said pressure and feed roll.

5. An apparatus as defined in claim 1 wherein said work moving and aligning means includes a guide bar disposed adjacent one side of said first work supporting table, a pair of spaced rolls adjacent said guide bar and angularly disposed with respect thereto, said guide bar in engagement with the edges of a stack of sheets, a pair of power rolls spaced from said guide bar adjacent the opposite side of said table, said power rolls movable from an inoperative to an operative position into engagement with the opposite edges of said stack of sheets.

6. An apparatus as defined in claim 2 wherein said work transfer means further includes means to engage the edges of a stack of superposed panels to move the same into engagement with the work feeding means on said work supporting table, said work transfer means being vertically adjustable to vary the number of panels transferred, said supply maintaining means being vertically adjustable and means on said work transfer means to limit vertical movement of said supply maintaining means, said supply maintaining means further including aligning members to control the edges of a plurality of stacked panels supported thereon.

7. An apparatus as defined in claim 2 wherein said work transfer means and said work supporting table include means to retard movement of a stack of panels from said supply to said saw blades.

8. An apparatus as defined in claim 2 wherein the transfer means between said first table and the supply maintaining means adjacent said second table include a first support to receive a plurality of stacked sheets from said first table, conveyor means underlying said first support and extending outwardly therefrom and terminating adjacent a second support frame, means to lower said first support to place said stacked sheets on said conveyor means whereby the same are moved onto said second support.

9. An apparatus as defined in claim 8 wherein said second support is in alignment with the supply maintaining means adjacent said second table and comprises a vertically movable openwork frame on which said stack of sheets is held, a plurality of driven feed rolls disposed below said openwork frame, said openwork frame movable below the level of said feed rolls whereby the engagement of said feed rolls with said stack of sheets moves the same onto said supply maintaining means.

References Cited in the file of this patent

UNITED STATES PATENTS

| Re. 6,064 | Lamb et al. | Sept. 22, 1874 |
| 254,202 | Euston | Feb. 28, 1882 |
| 614,089 | Coleman | Nov. 15, 1898 |
| 726,329 | Morgan | Apr. 28, 1903 |
| 816,079 | Diehl | Mar. 27, 1906 |
| 1,734,099 | Smith et al. | Nov. 5, 1929 |
| 2,031,385 | Peterman et al. | Feb. 18, 1836 |
| 2,540,004 | McFall | Jan. 30, 1951 |
| 2,649,872 | Miller | Aug. 25, 1953 |
| 2,936,007 | Palm | May 10, 1960 |